April 15, 1952     G. W. WALRAFEN     2,592,985
APPARATUS FOR WORKING PLASTIC MATERIAL
Filed Oct. 8, 1948
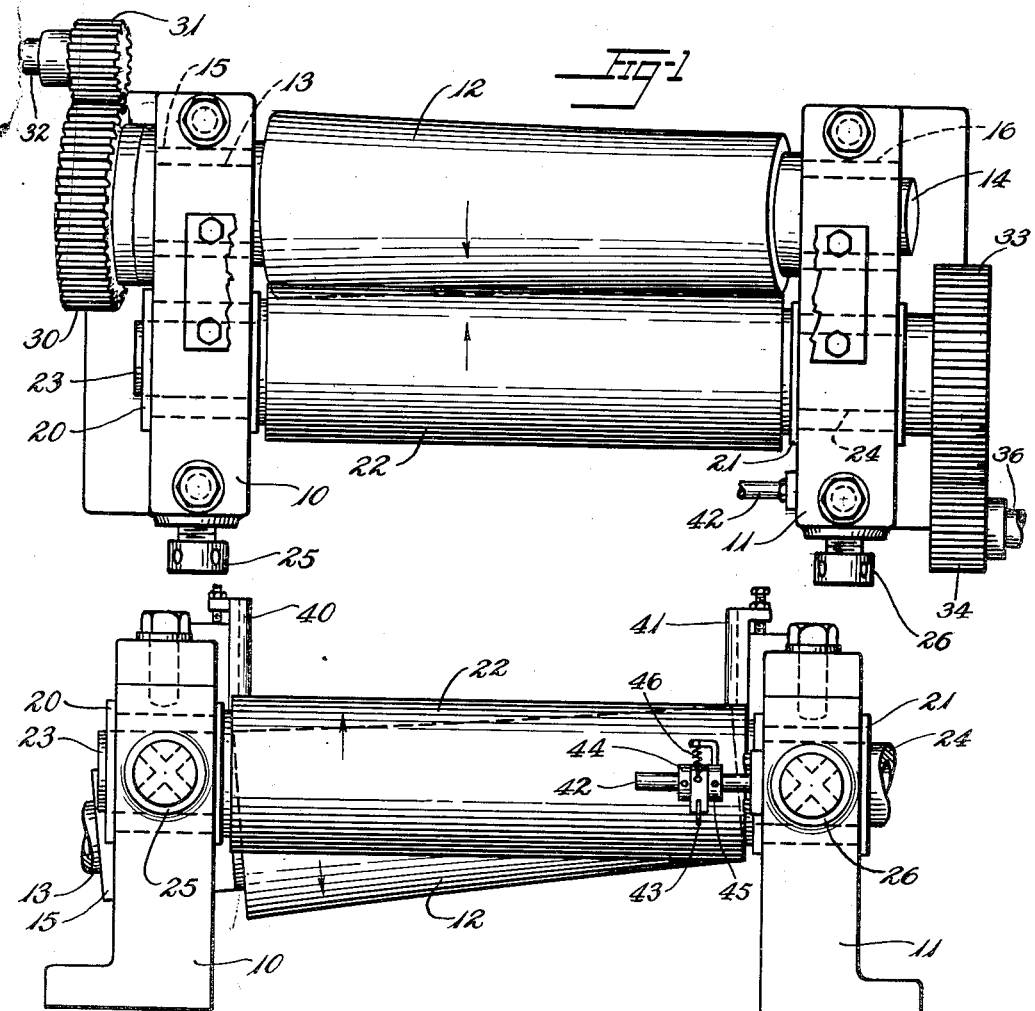
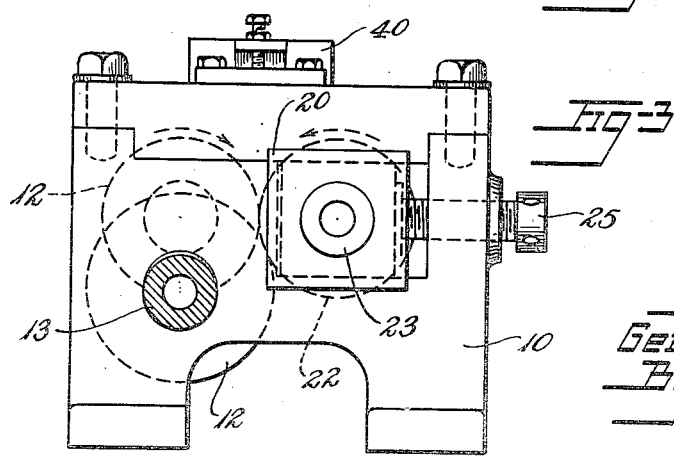
Inventor
Gerald W. Walrafen Patented Apr. 15, 1952

2,592,985

UNITED STATES PATENT OFFICE 2,592,985

APPARATUS FOR WORKING PLASTIC MATERIAL

Gerald W. Walrafen, Akron, Ohio, assignor to The B. F. Goodrich Company, New York, N. Y., a corporation of New York Application October 8, 1948, Serial No. 53,551

8 Claims. (Cl. 18—2)

This invention relates to apparatus for plasticizing mixing and grinding plastic materials and is especially useful in milling rubber or other plastic materials where it is desired to plasticize them prior to calendering or extruding the material.

In the manufacture of articles of rubber or other rubber-like material, the ingredients of the composition have usually been mixed and worked by passing them repeatedly between rollers which preferably are rotated at differential surface speeds. The rollers have usually been of plane cylindrical form and after the rubber material has been passed several times between the rolls, the rubber-like material and the rolls become heated and the material becomes sufficiently plastic to form a continuous band about one of the rolls. The operator has then cut the material from the roll in smaller batches which have been stored for future use or have been used directly to feed a calender or extruding machine which forms the material to sheet or strip form. Such apparatus has required constant attendance of an operator and delivery of the plasticized material from the warm-up mill has not been uniform.

Objects of the present invention are to overcome the foregoing and other difficulties by providing for continuous progressive working of the plastic material, to provide for progressive travel of the material from one end of the rolls to the other, to provide differential movement of the material-engaging surfaces of the rolls both in a circumferential direction and in an axial direction, to provide for delivery of the plasticized material at one end of the rolls, and to provide for changing the differential rotative movement of the rolls at will.

These and other objects will appear from the following description and the accompanying drawings.

Of the drawings,

Fig. 1 is a plan view of apparatus constructed in accordance with and embodying the invention, parts being broken away.

Fig. 2 is a front elevation thereof.

Fig. 3 is an end elevation thereof.

Referring to the drawings, the numerals 10, 11 designate end frame members mounted upon a suitable bed plate or foundation (not shown) in spaced-apart relation. A back roll 12 has journal portions 13, 14 of reduced diameter rotatably mounted in bearings 15, 16 secured respectively to frame members 10, 11, the axis of the roll being inclined with respect to the horizontal and the left end of the roll, as seen in Fig. 2, being lower than the right end.

The end frames 10, 11 are slotted to provide horizontal guide ways in which a pair of bearings 20, 21 are slidably mounted for horizontal movement. The front roll 22 has journal portions 23, 24 rotatably journaled in the bearings 20, 21 respectively. The bearings 20, 21 are adjustable horizontally toward the back roll and for adjusting them, capstan screws 25, 26 are threaded to engage through threaded openings in the frame members and impinge against the bearings 20, 21 respectively, the arrangement being such that by means of the screws, the front roll may be adjusted toward the back roll and material passing between the rolls forces the front roll away from the back roll.

To provide for contact of the rolls from end to end, the front roll 22 has a cylindrical working portion of uniform diameter and the back roll has a concave conoidal portion curved axially across its face to provide contact throughout the length of the working face of the front roll, the back roll as shown being larger in diameter at its left end than at its right end.

The rolls 12, 22 are driven in the direction indicated by the arrows in the drawings so that their upwardly-facing surfaces travel toward each other, and for driving them, the roll 12 has a gear 30 secured thereto and engaging a pinion 31 on a shaft 32 driven from any source of power such as a motor (not shown). Also, the roll 22 has a gear 33 fixed thereto and engaging a pinion 34 on a shaft 36 driven by a second source of power, such as a motor (not shown). The motors are preferably of the variable speed type so that the rolls 12, 22 may be driven at the same speed or at a range of differential surface speeds as desired.

Suitable guides 40, 41 may be mounted at the ends of the rolls for preventing the plastic material from moving beyond the roll faces. The guides are adjustably mounted on the frame members 10, 11 as is the practice on ordinary rubber mills.

For trimming the plastic material from the delivery ends of the rolls, a knife-holding rod 42 is mounted on the frame member 11 and a trimming knife 43 is rotatably mounted thereon between collars 44, 45 adjustably secured thereto. A spring 46 is secured between an arm of collar 45 and the knife to hold the knife against the roll 22. The knife is spaced laterally of the guide 41 to provide for cutting a continuous strip of plasticized material from the front roll.

As is usual in rubber mills, the rolls 12, 22 are hollow and suitable slip connections are provided at their ends for circulating heating or cooling fluid therethrough for heating or cooling the rolls as desired.

In the operation of the apparatus, the rubber-like material is applied to the nip of the rolls from above at the left end of the rolls as seen in Figs. 1 and 2 and is carried about the front roll. The angular disposition of the back roll causes the material to be fed to the right end of the rolls as seen in Figs. 1 and 2 as a result of the axial component of movement imposed by the roll surfaces on the material between them, and at the same time the material is plasticized by the differential rotary movement of the rolls due to the difference in their surface speeds. As the plasticized material reaches the guide 41 a continuous strip is cut therefrom by the knife 43 corresponding in width to the distance of the knife from the margin of the plasticized material. New material may be added from time to time at the left end of the rolls.

Superior plasticizing and mixing is accomplished as the material is worked in two directions by the angular position of the rolls.

Variations may be made without departing from the scope of the invention as it is defined by the following claims.

I claim:

1. Apparatus for working plastic material, said apparatus comprising a supporting frame, and a plurality of cooperating rolls mounted for rotation therein, at least one of said rolls having a concave conoidal face for cooperating with another of said rolls by contact therewith throughout the axial extent of their working faces.

2. Apparatus for working plastic material, said apparatus comprising a supporting frame, and a plurality of cooperating rolls mounted for rotation therein, at least one of said rolls being of greater diameter at one portion thereof than at another portion thereof and being of concave contour in an axial direction with faces of said rolls adapted to contact one another throughout their extent.

3. Apparatus for working plastic material, said apparatus comprising a supporting frame, and a plurality of rolls mounted for rotation therein, one of said rolls being cylindrical, another of said rolls having a concave conoidal face, and said rolls being mounted to contact each other along a line across their faces.

4. Apparatus for working plastic material, said apparatus comprising a supporting frame, and a plurality of rolls mounted for rotation therein about axes in nonintersecting-nonparallel relation one to another, means for adjusting one of said rolls toward another, at least one of said rolls having a concave conoidal face, and the surfaces of said rolls being parallel to each other throughout a nip of said rolls.

5. Apparatus for working plastic material, said apparatus comprising a supporting frame, and a plurality of rolls mounted for rotation therein, means for adjusting one of said rolls toward another, about axes in nonintersecting-nonparallel relation one to another, at least one of said rolls having a concave conoidal face, and the surfaces of said rolls being parallel to each other throughout a nip of said rolls, and means for driving each roll independently.

6. Apparatus for working plastic material, said apparatus comprising a supporting frame, and a plurality of cooperating rolls mounted therein for rotation in opposite directions, the axis of one of said rolls being inclined to and intersecting a plane including the axis of the other, and the faces of said rolls being parallel to each other along a nip between the rolls, means for adjusting one of said rolls toward the other, means for driving each roll independently of the other, and guides at the ends of the rolls for confining the plastic material to the roll faces.

7. Apparatus for working plastic material, said apparatus comprising a supporting frame, and a plurality of cooperating rolls mounted therein for rotation in opposite directions, the axis of one of said rolls being inclined to and intersecting a plane including the axis of the other, and the faces of said rolls being parallel to each other along a nip between the rolls, means for adjusting one of said rolls toward the other, means for driving each roll independently of the other, and guides at the ends of the rolls for confining the plastic material to the roll faces, and means at one end of the roll faces for cutting a strip of plastic material from the face of one of the rolls.

8. Apparatus for working plastic material, said apparatus comprising a supporting frame, and a plurality of rolls rotatably mounted therein for cooperation with each other, one of said rolls being tapered from end to end and having a concave face, said rolls engaging each other throughout the length of their faces.

GERALD W. WALRAFEN.

REFERENCES CITED

The following references are of record in the file of this patent:

UNITED STATES PATENTS

| Number | Name | Date |
|---|---|---|
| 24,765 | Shaw | July 12, 1859 |
| 1,102,623 | Worsey | July 7, 1914 |
| 1,102,624 | Worsey | July 7, 1914 |
| 1,342,114 | Iddon | June 1, 1920 |
| 1,568,820 | Fenlason, Jr. | Jan. 5, 1926 |
| 1,998,866 | Fowler | Apr. 23, 1935 |
| 2,277,313 | Fowler | Mar. 24, 1942 |
| 2,393,058 | Pierce et al. | Jan. 15, 1946 |

FOREIGN PATENTS

| Number | Country | Date |
|---|---|---|
| 116 | Great Britain | 1889 |
| 124,955 | Germany | Nov. 11, 1901 |
| 528,671 | Great Britain | Nov. 4, 1940 |
| 578,920 | Great Britain | July 17, 1946 |